United States Patent Office 3,390,512
Patented July 2, 1968

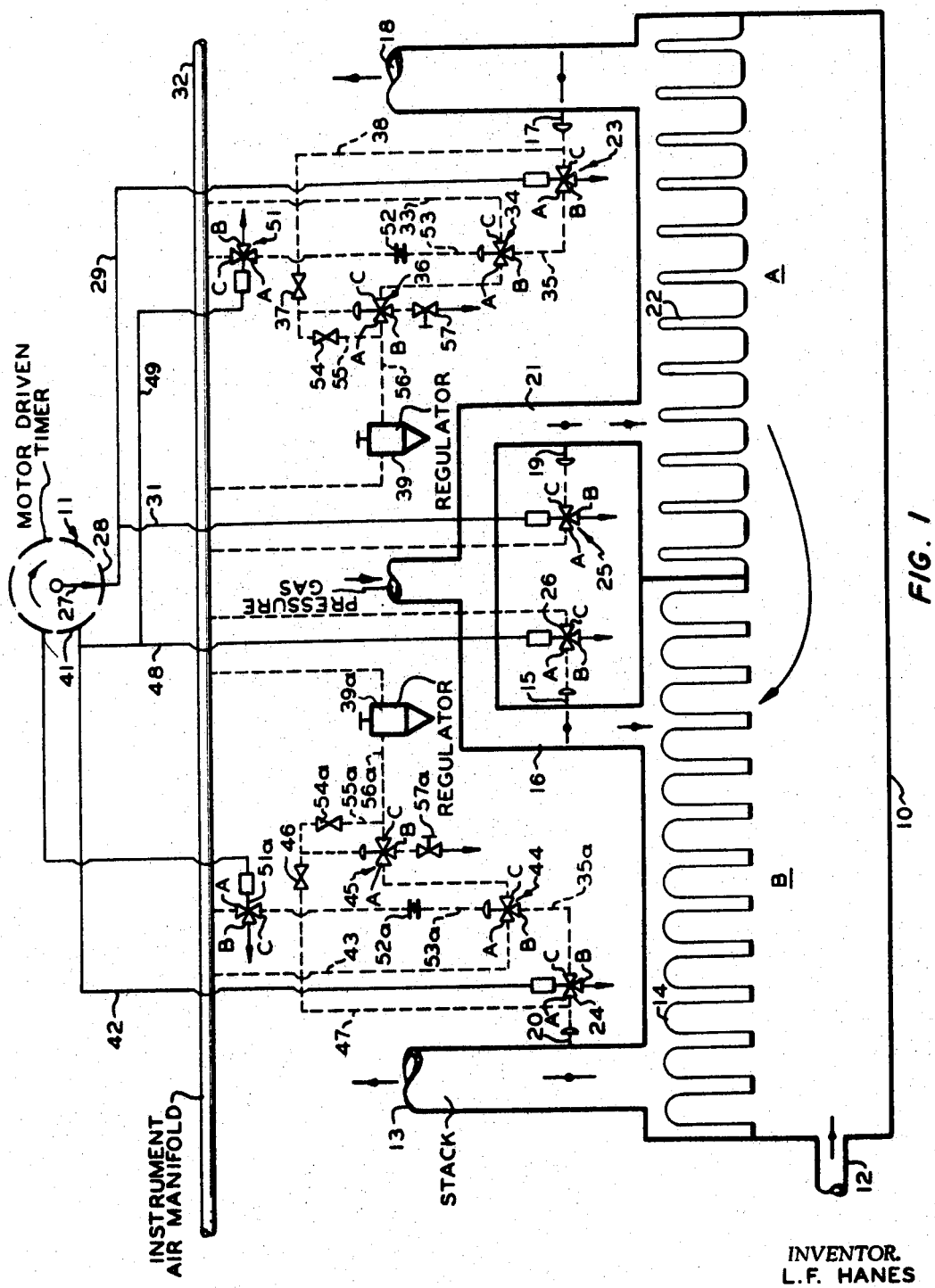

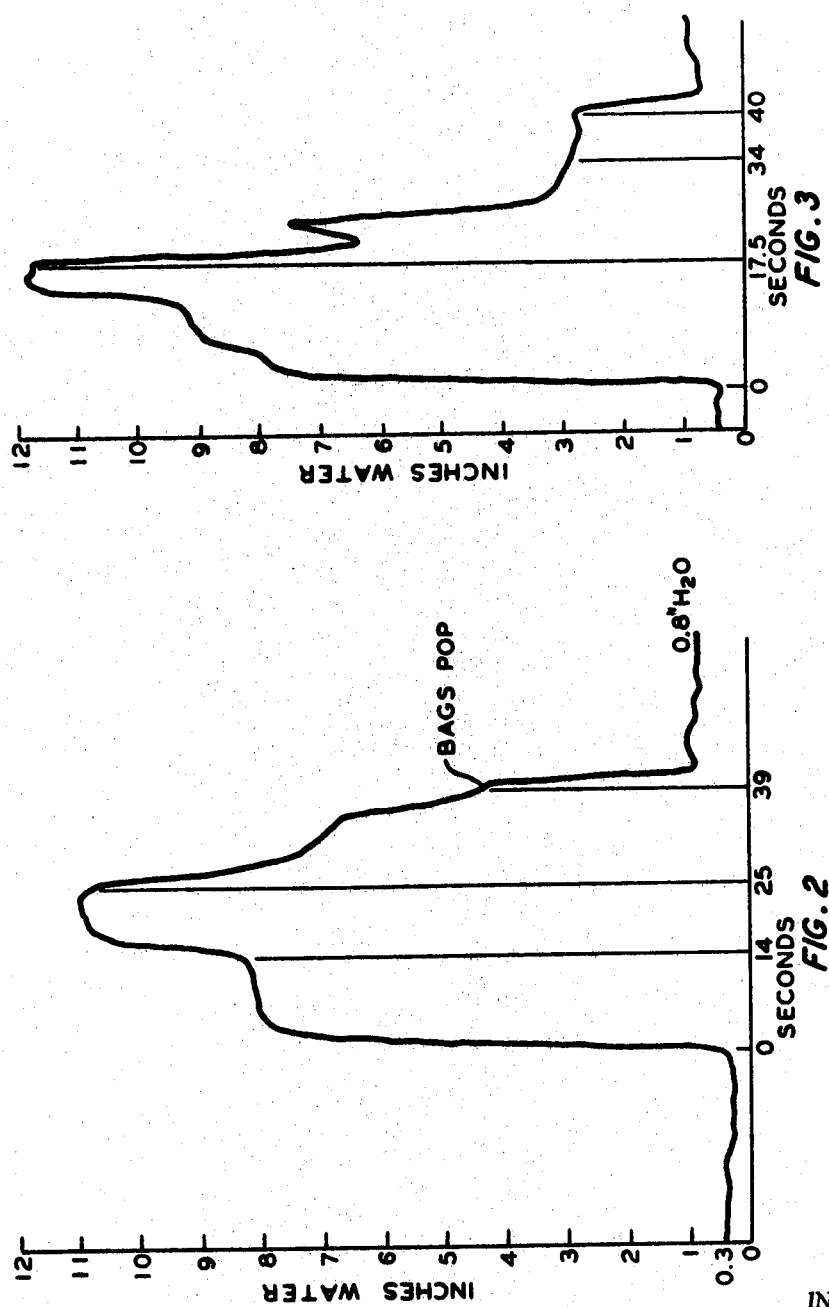

3,390,512
METHOD AND APPARATUS FOR FILTERING GAS AND CLEANING OF FILTER BAGS
Lewis F. Hanes, Bartlesville, Okla., assignor to Phillips Petroleum Company, a corporation of Delaware
Filed May 21, 1962, Ser. No. 196,404
11 Claims. (Cl. 55—96)

This invention relates to the controlled operation of pressure release valves so as to control, within prescribed limits, the velocity of fluids passing through such valves. In one aspect the invention relates to a method and means for reducing the pressure of a fluid in a confined zone under controlled conditions of fluid velocity within said zone. In one of its more limited aspects the invention relates to a method and means for reducing the pressure in a carbon black filter bag apparatus without deleterious effects to the filter bags and in a minimum period of time.

In many industries there exists the problem of removing suspended solids from a stream of gas which is to be vented to the atmosphere. In some instances it is desirable, from an economical standpoint, to recover the solids so removed. In other instances it is desirable, particularly in congested, populated areas, to remove solids from vented gases to avoid pollution of the atmosphere even though the solids themselves may not be recovered as a product. Various designs of different types of filtering equipment have been developed and are in use at the present time. One type of filtering apparatus used is that commonly called the "bag filter" wherein the smoke or solids laden gases pass through fabric bags which are maintained in an inflated state by the passage therethrough of the gases being filtered. The instant invention relates to such a bag filter apparatus and to the operation of such apparatus and will be described and illustrated as applied to the separation of carbon black particles from the hot effluent gas suspension coming from a carbon black furnace. However, it is to be understood that the instant invention is not to be unduly limited to such application since it can be employed in any system where it is desired to remove heavier-than-air solids from a gas wherein bag filters are employed.

One problem which has plagued the operators of bag filter apparatus is that of the bags bursting or being ripped by the gases passing therethrough. It has been determined that failure of the fabric bags results from rapid inflation of the filter bags following the back flow cycle, wherein gas is passed through the filter medium in a direction opposite to that of the filtering cycle to clean the filter bags by removal of carbon black particles deposited thereon. During the cleaning cycle the gas which is passed in backflow direction through the filter medium collapses, or at least partly collapses, the filter bags and the static pressure in the filter bag compartment is increased to a pressure which can be in the range of about 12 inches of water as compared to a static pressure of less than 1 inch of water during the filtering cycle. The change of direction of gases passing through the filter bags at the completion of the cleaning cycle, by the sudden release of the pressure in the filter bag compartment, causes a rapid inflation of the filter bags accompanied by an audible popping. The "popping" of the bags occurs within about 2–4 seconds after the valve is fully opened. It has been determined that the valve can be opened slowly over a period of about 13–15 seconds so that popping of the bags does not occur; however, the filtering ability of the filter bags was impaired, being about 50 percent better with popping of the bags. The bags in use and under study were fabricated of fiberglass but the same problems and the same solution to the problems, according to the practice of the invention, apply to bags fabricated of other materials.

It is an object of the invention to provide an improved method and means for filtering suspended solids from a gas containing such solids suspended therein. Another object of the invention is to provide a method and means for inflating filter bags in a bag filter unit rapidly without popping the filter bags. Still another object of the invention is the provision of a method and means for increasing the life of filter bags in a bag filter unit without unduly impairing the efficiency of the filtering operation. An additional object is to provide an improved method and means for filtering carbon black from the smoke of carbon black reactors. Other objects and advantages of the invention will become apparent to one skilled in the art upon consideration of the disclosure of the invention including the detailed description of the invention and drawing wherein:

FIGURE 1 is a schematic elevation, partly in section, of a bag filtering apparatus embodying the invention;
FIGURE 2 is a pressure tracing of the inflation of filter bags prior to practice of the invention; and
FIGURE 3 is a pressure tracing of the inflation of filter bags according to the invention.

I have discovered that a filter bag compartment can be put on the filtering cycle after completion of the cleaning cycle in a very short time by opening the exhaust or stack valve full open for a few seconds so that the filter bags are substantially, but not completely, inflated; and then partly closing the stack valve so as to reduce the velocity of the gases passing through the compartment until the filter bags are fully inflated and the normal filtering cycle is established. According to this procedure, bag popping is avoided and the transition from the cleaning cycle to the filtering cycle is accomplished with a minimum loss of filtering time.

I have found that filtering efficiency is not unduly impaired by avoiding bag popping according to the present invention, as had been indicated by results obtained when the stack valve was opened slowly. It is believed that the sudden reduction is gas velocity by partly closing the stack valve causes the kinetic energy of the rushing gases to be expended in doing work by inflating the bags but without popping the bags so that additional filtering time, over that of slowly opening the bags, is realized during each filtering cycle. In any event the present invention increases bag life without substantially impairing the efficiency of the bag filter unit.

The partial closing of the valve should occur when the pressure drop across the filter medium is at or near the minimum value.

Referring now to the drawing, FIGURE 1 illustrates, schematically, two compartments of a multicompartment carbon black bag filter apparatus 10. It is to be understood that as many compartments as desired can be joined in a single apparatus. The motor driven timer 11 is illustrated as controlling six compartments. Carbon black laden gas or smoke is admitted to compartments A and B via conduit 12. Filtered gas passes out of stack 13, through open valve 20, after passing through filter bags 14, shown in inflated condition. Thus, compartment B is in the filtering cycle, valve 15 in pressure gas conduit 16 being in closed position. Compartment A is in the cleaning cycle with valve 17 in stack 18 being closed and valve 19 in pressure gas conduit 21 being open. Filter bags 22 in compartment A are collapsed or partly collapsed due to the flow of gas from the outside of the bags to the inside of the bags during the cleaning cycle.

Valves 17, 20, 19 and 15 are diaphragm actuated valves operated by solenoid valves 23, 24, 25 and 26, respectively.

The contactor 27 of motor driven times 11 is in contact with segment 28 of the time cycle so that electrical energy is transmitted to solenoid valves 23 and 25 via leads 29 and 31, respectively, so that the instrument air from manifold 32 passes via conduit 33; ports C, B of valve 34; conduit 35; and is blocked by closed port A of valve 23. The air pressure on the diaphragm of valve 17 is vented via ports C, B of valve 23 so that valve 17 is closed. The pressure on the diaphragm of valve 36 is also vented via open valve 37, conduit 38 and ports C, B of valve 23 so that ports A, C of valve 36 are open and flow of air through regulator 39 is blocked at port A of valve 34.

Air is vented from the diaphragm of valve 19 via ports C, B of valve 25 so that valve 19 is in open position when electrical energy flows via lead 31.

Contactor 27 of timer 11 breaks contact with segment 28 and makes contact with segment 41. Solenoid valves 23 and 25 are switched so that valve 19 is closed and valve 17 is opened. Electrical energy is transmitted via lead 42 to solenoid valve 24 which is attached so that air passing via conduit 43; ports A, B of valve 44; and conduit 35a is blocked by closed port C of valve 24. Air pressure on the diaphragm of valves 45 and 20 is vented via open valve 46, conduit 47 and ports A, B of valve 24 so that valve 20 is closed.

Electrical energy transmitted via lead 48 activates solenoid valve 26 so that air is vented from the diaphragm of valve 15 via ports A, B of valve 26 and valve 15 is opened.

Electrical energy transmitted via lead 49 actuates solenoid valve 51 opening parts A, C of valve 51 and admits air pressure to the diaphragm of valve 34 closing port C of valve 34 so that the air supply of regulator 39 passes via ports A, C of valve 36; ports A, B of valve 34; and ports A, C of valve 23 to the diaphragm of valve 17 so that the position of valve 17 is reduced to only partially open. Valve 17 remains in this position until contactor 27 of timer 11 breaks contact with segment 41. When contact is broken between contactor 27 and segment 41 solenoid valve 51 switches so as to open ports A, B and vent the pressure from the diaphragm of valve 34 which switches passing air via ports C, B of valve 34; and ports A, C of valve 23 to put full instrument air pressure on diaphragm valve 17 opening it wide open. When full instrument air pressure is applied to diaphragm valve 17 it is also applied to diaphragm valve 36 via conduit 38 switching valve 36 so as to close port A and open ports C, B. Valve 36 is set to open ports A, C at about 8 p.s.i. or less and to open ports C, B at about 14 p.s.i. In other words, valve 36 is normally open (NO) with respect to ports A, C. Valves 34 and 51 are normally closed (NC) with respect to ports A, C. Stack valve 17 is normally closed and pressure gas valve 19 is normally open. The instrument air pressure on manifold 32 is about 35 p.s.i.

The sequence as above described continues around the circle of the timer 11. The space between the contact segments is such that there is only about 1 second between the cycle sequence. About 3–4 seconds are required to open stack valves 17 and 20 to wide open or full open position. Solenoid valve 51 is opened to admit instrument air to the diaphragm valve 34 at the next in sequence cleaning cycle or in other words when contactor 27 contacts timer segment 41. A restriction in the form of an orifice 52 is positioned in conduit 53 leading from valve 51 to valve 34 so as to delay the action of valve 34 about 2 or 3 seconds. This delaying action can also be accomplished by increasing the length of, or decreasing the diameter of conduit 53; by installing a surge pot in conduit 53; or by other means. It is not desirable to effect the delaying action of valve 34 by increasing the time between cycle sequence because the cycle sequences should follow each other with the minimum amount of time for efficient operation of the apparatus.

The valve operating sequence will be the same in each compartment and elements in compartment B which have not been described with respect to the operation of the elements in compartment A are designated by numbers of corresponding elements of compartment A followed by a.

An alternate, but somewhat less preferred, method of achieving precisely controlled dampening of the opening of stack valve 17 so as to avoid popping the filter bags 22 is to close valve 37 in conduit 38 and open valve 54 in conduit 55 so that the diaphragm of valve 36 is operated by the air pressure in conduit 56. Thus, when valve 51 switches valve 34, after the time delay, to close port C and open ports AB of valve 34, the pressure in conduit 56 is increased by the release of pressure on the diaphragm of valve 17 through ports A, C of valve 23 and ports, B, A of valve 34. Valve 36 then switches because of the increase in pressure to close port A and the residual pressure on the diaphragm bleeds off through ports C, B of valve 36 and through adjustable valve 57 which is set to retard the flow therethrough so that the regulator 39 can reduce the excess pressure in conduit 56 to actuate valve 36 and open ports A, C of valve 36 and apply regulator pressure on diaphragm valve 17 before the pressure can be exhausted through valve 57.

Successful operation of this less preferred method is dependent upon proper adjustment of valve 57 so as to release the proper amount of air without releasing all of the air pressure. At the end of the cleaning cycle, valve 17 must proceed to full open position for about 2 to 3 seconds and then proceed to partly closed position over a period about 5 seconds to reduce the velocity of the gases passing through the filter bags 22 until the bags are completely inflated so as to avoid popping the bags. It is considered essential that each compartment be placed on the filtering cycle as soon as possible at the completion of the cleaning cycle in order to operate the apparatus at optimum efficiency.

The invention will now be illustrated by reference to specific examples which will facilitate understanding the invention but are not to be construed as unduly limiting the invention.

*Example*

In a carbon black bag filter apparatus as illustrated schematically in FIGURE 1 the opening of the stack valve 17 was controlled by prior art methods of dampening in an effort to avoid popping the bags and a pressure tracing of the operation is shown in FIGURE 2. The cleaning cycle was set at 25 seconds and the stack valve was opened over a period of about 15 seconds. The bags popped upon each opening of the stack valve even when the opening of the valve was dampened over a period which was not economically feasible.

The pressure tracing of FIGURE 3 was taken after the method of the invention of opening stack valve 17 was applied to the apparatus. The pressure tracing of FIGURE 3 shows that valve 17 was advancing to open position for about 2–3 seconds to reduce the pressure from about 12 inches of water to about 6 inches of water at which time the valve was being partly closed by the delayed action of valve 34. The small peak which appears to indicate an increase in pressure during depressurizing the bag compartment is believed to be caused by work being done inflating the bags. The pressure tracing of FIGURE 3 represents the pressure in the bag compartment or in other words the pressure on the clean side of the bags. The pressure on the dirty side of the bags was normally about 8 inches of water and at the time of the formation of the small pressure peak, during depressurizing the filter bag compartment, the pressure drop across the filter medium was substantially zero so that depressurizing the filter bag compartment was momentarily halted for the time required to inflate the filter bags. If the partial closing of the valve is appreciably earlier the peak is somewhat leveled out and covers a longer period of time. If the partial closing of the valve is appreciably later the peak is substantially eliminated and the bags pop.

In the specific example herein the pressure on the dirty side of the bags was about 8 inches of water and about 2 seconds were required to reduce the pressure on the clean side of the bags to about this value. It should be noted that when the pressure on the clean side is released the pressure on the dirty side will be reduced slightly for a few seconds.

In the above example, the stack valve was closed to about one-half its open cross-sectional area.

That which is claimed is:

1. The method of exhausting pressurized gas from a bag filter compartment of a filter unit wherein a solids laden gas is passed through filter bags in a bag filter compartment and clean gas is exhausted through an exhaust valve and wherein the exhaust valve is periodically closed and a pressurized gas is passed through said bags countercurrent to the flow of solids laden gas and at an elevated pressure with respect to said solids laden gas, after which passage of pressurized gas is terminated and the exhaust valve is open, which method comprises opening the exhaust valve to full open position for a time sufficient to equalize substantially the gas pressure on each side of the filter bags and to inflate substantially the filter bags; partly closing, without fully closing, said exhaust valve so as to reduce the velocity of the gases passing through said compartment until the filter bags are completely inflated; and then opening the exhaust valve to full open position.

2. The method of opening a stack valve of a carbon black plant bag filter compartment containing filter bags at the end of the filter cleaning cycle which comprises opening the stack valve to wide open position for a time sufficient to reduce the pressure on the clean side of the bags so as to inflate substantially the filter bags; partially closing, without fully closing, the stack valve to reduce the velocity of the gas passing through the filter bags until the filter bags are fully inflated; and then opening the stack valve to wide open position.

3. The method of opening a stack valve in a compartment containing filter bags of a carbon black bag filter apparatus at the completion of a cleaning cycle of said compartment which comprises opening the stack valve to full open position for a time sufficient to inflate substantially but not completely the filter bags in said compartment; partly closing, without fully closing, said stack valve to about 35 to 55 percent of the cross-sectional area of the stack valve for a time sufficient to inflate completely said filter bags; and opening said stack valve to full open position.

4. The method of opening a stack valve in a compartment containing filter bags of a carbon black bag filter apparatus at the completion of a cleaning cycle of said compartment which comprises opening the stack valve to full open position for a time sufficient to inflate substantially but not completely the filter bags in said compartment; immediately partly closing, without fully closing, said stack valve for an amount sufficient to reduce the velocity of the gases passing through said compartment to below bag popping velocity; and then opening said stack valve to full open position.

5. The method of claim 4 wherein the stack valve is opened full for a time sufficient to reduce the static pressure in said compartment to about ½ its maximum value and the stack valve is partly closed sufficiently to reduce the static pressure in said compartment to about ¼ its maximum value.

6. In a bag filter unit comprising a plurality of compartments containing filter bags, means to introduce a solids laden gas to said filter bags in said compartments, a stack valve to remove clean gas from each of said compartments, a cleaning gas valve to supply pressurized cleaning gas to each of said compartments, and wherein the filtering is cyclically operated by a timer on a filtering cycle with the stack valve open and the cleaning gas valve closed so that the filter bags are inflated and a cleaning cycle with the stack valve closed and the cleaning gas valve open so that the filter bags are deflated, apparatus comprising valve operating means actuated by the timer at the end of the cleaning cycle to open the stack valve to full open position; and time delay means actuated by said timer so as to cause said valve operating means to partly close, without fully closing, the opened stack valve for a time approximately equal to that of the cleaning cycle and then to open the stack valve to full open position.

7. The bag filter unit of claim wherein the stack valve is a diaphragm operated valve and the valve operating means is a solenoid valve to admit fluid from a pressure supply to the diaphragm of the stack valve.

8. The bag filter unit of claim 7 wherein the time delay means comprises a fluid pressure regulator and a valve to substitute the fluid output of the regulator on the stack valve diaphragm for the fluid from the pressure supply.

9. In a process for removing suspended solids from a stream of gas wherein the gas is admitted to the inside of a filter bag, clean gas is collected in a closed compartment enclosing the filter bag and is exhausted via an open exhaust valve, and wherein the exhaust valve is closed periodically and a pressurized gas is admitted to said compartment in a cleaning cycle to reverse the flow of gas through the filter bag to remove solid particles deposited on the filter surface, after which the step of removing solids from said stream of gas is resumed, the improvement which comprises terminating admittance of said pressurized gas; opening the exhaust valve to full open position for a time sufficient to inflate substantially the filter bag after the cleaning cycle; partly closing, without fully closing, said exhaust valve so as to reduce the velocity of the gas passing through said filter bag until the filter bag is completely inflated; and then opening said exhaust valve to full open position.

10. In a bag filter unit comprising a plurality of filter bags suspended in an enclosed compartment having a pressurized gas inlet valve and an exhaust valve and means for introducing a solids laden gas to said filter bags and wherein a timing mechanism closes the exhaust valve and opens the pressurized gas inlet valve for a cleaning cycle to clean the filter bags after which the pressurized gas inlet valve is closed and the exhaust valve is opened to resume the filtering operation, the combination therewith of means operatively connected to said exhaust valve and said timing mechanism to open said exhaust valve full open at termination of the cleaning cycle for a time sufficient to equalize substantially the pressure on the inside and outside of said filter bags; then to close said exhaust valve partly, without fully closing, for a time sufficient to inflate completely said filter bags; and then to open said exhaust valve to full open position.

11. The bag filter unit of claim 10 wherein the exhaust valve is a normally closed diaphragm valve operated by a supply of pressurized gas and the timing mechanism comprises a motor driven timer having a traveling contactor which contacts periodically a first timing mechanism contact segment for a period of time defining the cleaning cycle of the filter bags in said compartment; a second segment spaced from and adjacent said first segment; a first solenoid valve actuated by said contactor and first segment and connected to said exhaust valve to close said exhaust valve during said cleaning cycle; and a second solenoid valve actuated by said contactor and second segment and connected to said exhaust valve to maintain said exhaust valve partly open, without fully closing, for a period of time equal to that of the cleaning cycle whereby said exhaust valve is closed during the cleaning cycle, full open during the time the contactor is traveling from the first segment to the second segment, partly open, without fully closing, during the time the contactor is in contact with the second segment and then is full open.

References Cited

UNITED STATES PATENTS

| | | | |
|---|---|---|---|
| 2,836,256 | 5/1958 | Caskey | 55—303 X |
| 3,057,137 | 10/1962 | Perlis et al. | 55—303 |
| 2,746,561 | 5/1956 | Beber et al. | 55—272 |
| 2,871,978 | 2/1959 | Webster et al. | 55—341 |
| 2,943,637 | 7/1960 | Eichenauer | 137—224 |
| 2,980,207 | 4/1961 | Allen | 55—302 |
| 3,073,097 | 1/1963 | Hållett et al. | 55—283 |
| 3,116,119 | 12/1963 | Osburn et al. | 23—314 |
| 3,217,468 | 11/1965 | O'Dell | 55—96 |
| 3,243,940 | 4/1966 | Larson | 55—96 |

FOREIGN PATENTS 788,166  12/1957  Great Britain.

HARRY B. THORNTON, *Primary Examiner.*

REUBEN FRIEDMAN, *Examiner.*

B. NOZICK, *Assistant Examiner.*